Patented Mar. 12, 1946

2,396,585

UNITED STATES PATENT OFFICE 2,396,585

METHODS ELIMINATING THE COLORATION OF GLASS OBTAINED BY ELECTRIC MELTING

Bernard Long, Paris, France; vested in the Alien Property Custodian

No Drawing. Application October 13, 1941, Serial No. 414,866. In France September 4, 1940

2 Claims. (Cl. 106—52)

The melting of vitrifiable materials by the passage of an electric current in a bath of glass acting as resistor presents, among other inconveniences, that of imparting to the glass a yellow or greenish-yellow coloration which it has been attempted to attenuate by various means.

For that purpose, for instance oxidizing compounds, such as nitrates, capable of modifying the dyestuffs dissolved in the glass, have been mixed with the molten vitrifiable materials or glass. It has also been attempted to renew, by stirring, the contact surface of the molten glass with an oxidizing atmosphere. Finally, according to the nature of the electrodes, the quantity of energy dispersed per unit of volume in the immediate vicinity of said electrodes has been adjusted so as to reduce to the minimum the coloration of the glass for each mixture of vitrifiable materials.

Experience has shown that these various means are insufficient for overcoming the dyeing action of certain reducing bodies which remain in suspension in the glass, such as the particles of electrodes which are pulled off and dispersed by the passage of the current in the molten glass, and the compounds which are produced by the action of said particles on the sulphuretted vitrifiable materials, for instance on alkaline metal and alkaline-earth metal sulphates.

The invention consists in incorporating with the glass substances capable of dissolving the reducing bodies, such as sulphides, which are in suspension in the glass. Among these solvents zinc oxide and cadmium oxide are particularly efficient.

The substances thus incorporated are added, preferably, to the vitrifiable materials which are rendered oxidizing by addition of nitrates, arsenious anhydride, or antimony oxide for instance.

The proportion of solvents employed varies, of course, according to the quantity of reducing bodies in suspension in the glass. In particular for sodo-calcic glasses of ordinary composition a proportion of zinc oxide smaller than 5% is sufficient.

The following vitrifiable mixtures are given by way of examples:

Example I

| | |
|---|---|
| Sand | 100 |
| Carbonate of soda | 29.4 |
| Sulphate of soda | 3 |
| Nitrate of soda | 3 |
| Limestone | 26.8 |
| Zinc oxide | 2.7 |
| Arsenious anhydride | 0.5 |

Example II

| | |
|---|---|
| Sand | 100 |
| Feldspath | 11.8 |
| Carbonate of soda | 33.3 |
| Sulphate of soda | 1 |
| Nitrate of soda | 4 |
| Limestone | 21 |
| Dolomite | 6.8 |
| Zinc oxide | 4.5 |
| Arsenious anhydride | 0.5 |

Example III

| | |
|---|---|
| Sand | 100 |
| Borax | 3.8 |
| Hydrated alumina | 1.1 |
| Carbonate of soda | 36.7 |
| Nitrate of soda | 2 |
| Limestone | 20.3 |
| Zinc oxide | 6.4 |
| Antimony oxide | 0.7 |

Glass produced by the first mixture contains approximately 2% of ZnO, by the second mixture 3% of ZnO and by the third mixture 4.5% of ZnO.

Having now described my invention what I claim as new and desire to secure by Letters Patent is:

1. In the electric melting of glass, for overcoming the dyeing action of reducing bodies which remain in the molten glass including particles of electrodes and compounds produced by the action of said particles on the sulphuretted vitrifiable materials forming the melt, the step of adding to said materials which are already rendered oxidizing by the addition of a member of the group consisting of arsenious anhydride and antimony oxide, an oxide of the group consisting of zinc and cadmium.

2. In the electric melting of glass, for overcoming the dyeing action of reducing bodies which remain in the molten glass including particles of electrodes and compounds produced by the action of said particles on the sulphuretted vitrifiable materials forming the melt, the step of adding to said materials which are already rendered oxidizing by the addition antimony oxide, an oxide of cadmium.

BERNARD LONG.